United States Patent [19]

DeFilippo

[11] Patent Number: 5,669,991
[45] Date of Patent: Sep. 23, 1997

[54] ELECTRICAL DISCHARGE MACHINING OF COMPLEX HOLES USING SHAPE MEMORY ALLOY ELECTRODES

[75] Inventor: James DeFilippo, Manchester, Conn.

[73] Assignee: United Technologies Corporation, Hartford, Conn.

[21] Appl. No.: 396,837

[22] Filed: Mar. 1, 1995

[51] Int. Cl.$^6$ .............................. B23H 7/08; C22F 1/18
[52] U.S. Cl. .................. 148/563; 219/69.12; 219/69.15
[58] Field of Search ..................... 428/606, 608, 428/660, 675; 219/69.12, 69.15; 148/402, 563, 518, 537

[56] References Cited

U.S. PATENT DOCUMENTS

| | | | |
|---|---|---|---|
| 5,092,941 | 3/1992 | Miura | 148/402 |
| 5,133,721 | 7/1992 | Angulo | 148/402 |
| 5,458,597 | 10/1995 | Edwards | 606/41 |

FOREIGN PATENT DOCUMENTS

| | | | |
|---|---|---|---|
| 61-117020 | 6/1986 | Japan | 219/69.12 |
| 61-127892 | 6/1986 | Japan | 148/402 |
| 63-162118 | 7/1988 | Japan | 219/69.12 |
| 1-140922 | 6/1989 | Japan | 219/69.12 |

OTHER PUBLICATIONS

Paper Entitled, Electrical Discharge Machining Utilizing "Smart Electrodes", J.S. DeFilippo, E.G. Adamski, Presented at the International Conference on Shape Memory and Superelasticity: Engineering and Biomedical Application Asilomar Conference Center, Pacific Grove, CA, Mar. 6–10, 1994 (Patent Application filed Mar. 1, 1995).

A Thesis, Electrical Discharge Machining of Curved Holes for Turbine Airfoil Cooling, Edward G. Adamski, The University of Connecticut (Two Final Copies of Thesis retained in Director of Graduate Record's Office Until Apr. 1, 1995; After Apr. 1, 1995 Thesis Will be Released for Docketing in University Connecticut Library).

C.M. Wayman, "Some Applications of Shape–Memory Alloys", Journal of Metals, Jun. 1980, pp. 129–133, 135–137.

*Primary Examiner*—John Zimmerman
*Attorney, Agent, or Firm*—Christine M. Wilkes

[57] ABSTRACT

A method of electrical discharge machining at least one shaped hole in a metallic article using a shape memory alloy electrode is disclosed. The method comprises the steps of processing at least one shape memory alloy wire electrode to retain a trained shape; loading the electrode in an electrical discharge machining device; and electrical discharge machining at least one shaped hole in the article, whereby the hole approximates the trained shape of the electrode.

7 Claims, 1 Drawing Sheet

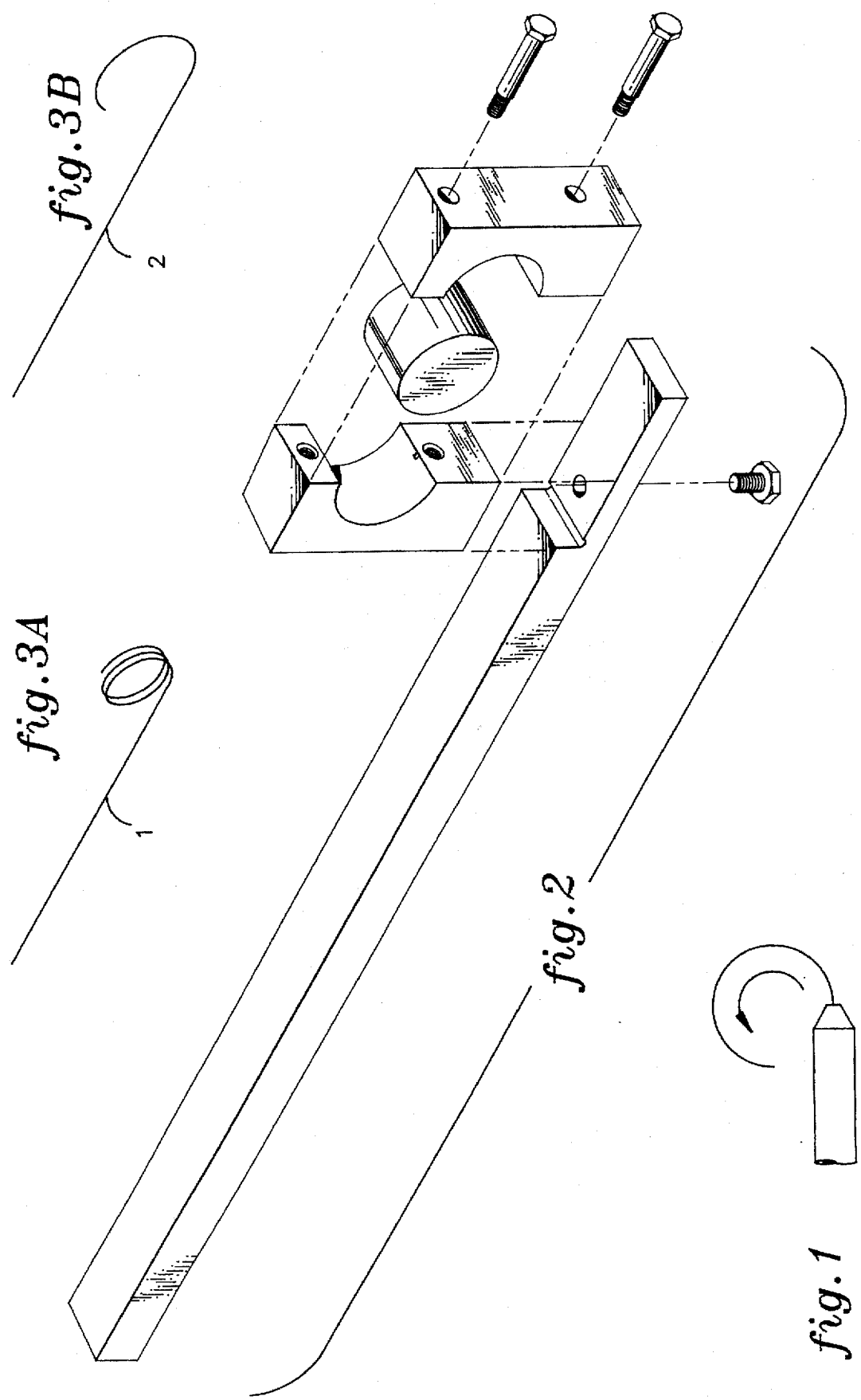

5,669,991

ELECTRICAL DISCHARGE MACHINING OF COMPLEX HOLES USING SHAPE MEMORY ALLOY ELECTRODES

TECHNICAL FIELD

The present invention relates generally to electrical discharge machining, and particularly to electrical discharge machining cooling holes in gas turbine engine components using shape memory alloy electrodes.

BACKGROUND ART

Gas turbine engines operate at high rotational speeds and high temperatures for increased performance and efficiency. The demand for greater efficiency requires engines to operate at temperatures well in excess of about 2750° F. (1508° C.). Direct exposure to this high temperature gas, however, detrimentally affects turbine blades and vanes by causing component distortion and even melting in extreme cases.

Cooling techniques have been developed to keep the temperature of the blades and vanes within design limitations while operating at high temperatures. For example, the outer surface of engine components are typically film cooled with cooling air from the compressor section of the engine. Film cooling employs a layer of cool air which is flowed between the high temperature gases and the external surfaces of the engine components. The layer of cooling air is formed by passing the cooling air through a series of small holes in the component.

As operating temperatures increase, the need for more advanced cooling techniques is testing the limits of modern technology. For example, complex cooling holes, such as curved and helical holes, may be necessary for successful engine operation at extremely high temperatures. These features are needed to ensure that sufficient film cooling, as well as proper heat transfer, occurs during engine operation while minimizing cooling air usage.

Electrical discharge machining (EDM) is a well known method for producing small, deep holes in metallic objects, such as gas turbine engine components. EDM is the process of removing material from an electrically conductive work piece through the use of high energy electrical discharges (sparks) in the presence of a dielectric fluid.

One known EDM method for producing cooling holes in engine components uses a shaped conductive electrode (usually copper). The electrode consists of at least one small diameter elongated end which produces the cooling air metering section. The elongated end is typically connected to a three-dimensional diffuser shaped portion which produces a diffuser area for the metering section. The electrode produces a shaped hole, with allowance for electrode overburn and EDM electrode erosion. A characteristic of current EDM technology is that the EDM electrode advances into the work piece along a straight line.

Although the above EDM method is useful, limitations exist. For example, copper electrodes have a significant low diameter limit due to the low melting point of copper. There is also a maximum length/depth ratio based on fragility. Any bending will significantly compromise the accurate hole placement and process repeatability.

In addition, it is difficult to EDM small, deep, complex cooling holes in some modern, complex airfoils. For example, paired vanes (two airfoils sharing inner and outer platforms) frequently require extremely small holes. The drilling of airfoils which have limited access, such as the above-mentioned paired vanes, is typically accomplished by bending an EDM electrode. In such cases the electrode holder is fed towards the airfoil to produce cooling holes. A limitation in such a process is the inability to continuously feed the electrode while keeping the electrode holder fixed. As a result, the potential benefits of this new generation of advanced airfoils cannot be maximized with current state-of-the art EDM hole drilling.

Accordingly, there is a need for a method to produce complex cooling holes in metallic articles.

There is also a need for an effective EDM method of producing small, complex cooling holes in gas turbine engine components such that advanced, internal cooling schemes may be maximized thereby allowing engine operation at increasingly higher temperatures.

Additionally, there is also a need for a flexible EDM electrode that is durable and easy to produce.

DISCLOSURE OF THE INVENTION

The present invention is directed to the satisfaction of the above needs. According to the present invention, a method of effectively producing small, complex cooling holes in metallic articles is disclosed. A novel electrode for use in this method is also disclosed.

In accordance with one embodiment of the present invention, a shape memory alloy (SMA) electrode is trained to retain a particular shape. Shape memory alloys are a distinct class of thermoelastic alloys which undergo a reversible austenite-to-martensite phase transformation. These alloys exhibit the unique properties of pseudoelasticity and/or shape memory effect (SME). The pseudoelasticity of shape memory alloys enables the alloys to recover their original shape upon removal of a stress. The shape memory effect allows the alloys to be fabricated and thermally processed (trained) to produce predetermined dimensional changes in response to changes in temperature. Shape memory alloy components may be thermally processed or "trained" to virtually any desired shape. A trained alloy can be deformed and will then resume its trained shape upon heating.

After the electrode is trained, it is loaded in an electrical discharge machining device where it is positioned in an electrode holder. As the electrode is fed from the electrode holder it machines a cooling hole in the article. The shape of the cooling hole approximates the trained shape of the electrode.

In accordance with one particular embodiment of the present invention, a shape memory alloy wire electrode is trained by coiling it and holding it in the coiled shape. The coiled electrode is then heat treated at about 1000° F. (538° C.) for about ten minutes, followed by a water quench. The electrode retains a curved shape.

After the electrode is trained, it is loaded into a conventional EDM device. The EDM device includes a guide channel having an entrance portion and an exit portion. The exit portion is in close proximity to the metallic article to be drilled. The electrode is fed into the guide channel such that the curved end of the electrode is contained within the guide channel.

One or more cooling holes are then drilled in the article. The tip of the curved end of the electrode is positioned within about 0.050 inches of the article and a flow of dielectric oil is supplied such that the article and tip are immersed in the oil. Electric potential is applied and the desired hole is electrical discharge machined. The shape memory alloy electrode assumes its curved, trained shape as it exits the guide and is heated by current flow. The resulting hole has a curved shape. This curved shape hole is possible because of the unique characteristics of shape memory alloys.

A benefit of the present invention is the ability to form a complex cooling hole, such as a curved cooling hole. Also, it now possible to continuously feed a curved electrode through a straight guide tube on an electrical discharge machining device and produce a cooling hole approximating the curved shape.

The present invention is also useful for the production of various features on metallic articles, such as notches or grooves (niches).

An advantage of the present invention is that the electrode can be easily fabricated into curved/helical or other complex shapes. The electrode is also tolerant of handling in production environments because it will always revert to its trained shape.

The degree of flexibility exhibited by the present invention far exceeds that of conventional EDM methods. The trained electrodes of the present invention can be continuously fed through stationary guide tubes which incorporate various twists or bends. This is a significant advancement since the drilling of airfoils which have limited access, such as paired vanes, is typically accomplished by bending an EDM electrode and/or holder and feeding the holder towards the airfoil. As a result of the present invention, airfoil design flexibility will be improved.

The foregoing features and advantages of the present invention will become more apparent in light of the following detailed description of the best mode for carrying out the invention and in the accompanying drawings.

BRIEF DESCRIPTION OF THE DRAWINGS

FIG. 1 shows a curved shape memory alloy electrode as it exits a guide tube.

FIG. 2 shows a training fixture.

FIG. 3(A) shows a multiple coiled shape memory alloy electrode.

FIG. 3(B) shows a single coiled shape memory alloy electrode.

BEST MODE FOR CARRYING OUT THE INVENTION

According to the present invention, a novel electrode for use in electrical discharge machining (EDM) holes in metallic articles is disclosed. In as much as it is well known in the art to produce holes in metallic articles by EDM using conventional electrodes, details of the process will not be described herein. Specific details can be found in U.S. Pat. No. 4,197,443 (Sidenstick) and U.S. Pat. No. 3,604,884 (Olsson), which are incorporated herein by reference.

In accordance with one embodiment of the present invention, a shape memory alloy electrode for the electrical discharge machining of cooling holes in metallic articles is disclosed. Shape memory alloys are a distinct class of thermoelastic martensitic alloys which undergo a reversible austenite-to-martensite phase transformation. These alloys exhibit the unique properties of pseudoelastic behavior and/or shape memory effect (SME). These properties enable shape memory alloys to be thermally processed or "trained" to virtually any shape. For example, this "training" may be accomplished by restraining the alloy shape and heating above a critical temperature to form the crystal structure of austenite. The alloy is then rapidly cooled. The critical temperature is primarily dependent upon alloy composition and to a lesser degree upon processing. Generally, shape memory alloys heated above a critical austenite temperature during training, which remain austenite when cooled, exhibit pseudoelastic behavior. This pseudoelasticity enables the alloy to change shape upon application of stress and revert to or "remember" its original shape upon removal of that stress.

The shape memory alloy electrode of the present invention may be formed from the following alloys or a combination of the following alloys: CuZn, CuZnAl, CuZnGa, CuZnSn, CuZnSi, CuAuZn, CuSn, AuCd, AgCd, NiTi, NiAl, and FePt. The above alloys are not brittle intermetallic compounds. Minor deviations from the above are possible as are minor alloying additions to change the critical temperatures and the mechanical properties. The electrode may be copper plated to improve electrode conductivity, cutting speed and wear characteristics.

The shape memory alloy electrode is processed to retain a trained shape. In this processing step, the electrode may be coiled around a fixture to capture the fixure's shape. Preferably, the fixture is cylindrical if a curved cooling hole is desired. However, the electrode may be restrained by various means in various shapes depending on the desired shape of the hole.

The electrode and fixture are then heat treated at about 1000° F. (538° C.) for about ten minutes, followed by a water quench. These parameters are suited for NiTi and those skilled in the art will appreciate that the processing parameters may vary with shape memory alloy electrode composition. After the processing step, the electrode is removed from the fixture and retains the trained shape. Preferably, the electrode is then plated with a material, such as copper, to improve conductivity, cutting speed and wear characteristics.

The "trained" electrode is loaded in an electrical discharge machining device. The electrical discharge machining device is conventional and includes a guide channel having an entrance portion and an exit portion for the electrode. A gap exists between the exit portion of the guide channel and the metallic article to be drilled.

Once the electrode is loaded in the EDM device, at least one cooling hole is machined in the metallic article. Operation of the EDM device is conventional. However, the cooling holes formed approximate the trained shape of the electrode because the SMA electrode assumes its trained shape as it exits the guide and is heated by current flow. The trained shape is "remembered" since the stress induced martensitic transformation due to guide constraint is reversed when the electrode exists the guide. Thus, a shaped cooling hole will be produced due to the electrode retaining its original trained shape. FIG. 1 demonstrates the feeding progression of a curved SMA electrode through a guide tube exit.

EXAMPLE

The present invention will now be described by way of example which is meant to be exemplary rather than limiting.

Nickel-titanium (NiTi) wire having a rectangular cross section of 0.016 inches×0.022 inches was used for the electrode material. The rectangular cross section provided control for the direction of curvature as the electrode exited the guide mechanism.

In order to train the electrode, the NiTi wire was constrained to the desired shape for the duration of a short heat treat cycle. This was accomplished by way of a simple fixture including a block and an appropriate size roller, as shown in FIG. 2. Each fixture was designed with a gap between the block and roller to accommodate the SMA wire as it was coiled around the roller.

Electrode training was achieved by first coiling the NiTi wire around the roller of the restraining fixture and locking it into position. The NiTi wire and restraining fixture were then heat treated at 1000° F. (538° C.) for ten minutes in an air furnace. The heat treat was immediately followed by a water quench. The curved NiTi electrodes were removed from the training fixtures and placed in a nitric ($HNO_3$) and hydrofluoric (HF) acid solution to remove any oxide layers which might have formed during the air furnace heat treatment. The volumetric composition of this stripping solution was 40% $HNO_3$, 2% HF, and 48% deionized $H_2O$. However, if heat treatment is performed in a vacuum, cleansing in an acid solution is not necessary.

Two electrode configurations were trained. These electrodes are shown in FIGS. 3(A) and 3(B). Electrode 1 shown in FIG. 3(A) was trained to a 0.250 inch radius of curvature and had multiple coils. It resembled a fully compressed spring. Upon uncoiling the 0.250 inch radius electrode, it was discovered that it possessed a large mount of stored energy. This high level of stored energy made the NiTi wire difficult to straighten and feed though an electrode guide. The stored energy caused a high level of frictional resistance within the electrode guide which hampered electrode feed.

Accordingly, electrode 2 shown in FIG. 3(B) was trained to a 0.500 inch radius of curvature and had a single coil. Increasing the radius of curvature from 0.250 inches to 0.500 inches resulted in a significant reduction in the frictional resistance within the electrode guide. In addition, the long straight segment of the electrode simplified its use in an EDM cartridge tool. As a result of the above benefits, the 0.500 inch single coil NiTi electrode was selected to demonstrate the SMA curved hole drilling technique.

Demonstration of the SMA curved hole EDM process was performed using a Raycon DS-6 EDM machine equipped with cartridge tooling. A ceramic electrode guide for the cartridge tool was designed and fabricated to accommodate a single 0.016 inch×0.022 inch rectangular electrode.

NiTi electrode material trained to the single coil configuration shown in FIG. 3(B) was loaded into the Raycon cartridge tool and the SMA drilling procedure was initiated by programming a CP-60 generator to select EDM parameters.

A 0.125 inch thick aluminum test plate was affixed to a machine table. The electrode guide was then positioned to bring the tip of the curved electrode within about 0.050 inches of the work piece surface. Once in position, a steady flow of dielectric oil was supplied to the cut zone and machining was initiated. Three curved holes were successfully machined into the aluminum test plate. Thus, the feasibility of producing complex holes, such as curved holes, in metallic articles was successfully demonstrated.

The electrode was removed from the guide and scrutinized. Examination of the electrode tip revealed taper wear. Applicant suggests that copper plating the NiTi electrodes may improve the materials conductivity, cutting speed, and wear characteristics, especially if the work piece is a Ni-base material.

Though the above indicates NiTi may not be the ideal electrode material, it has successfully demonstrated the feasibility of curved hole drilling utilizing the SMA approach.

It is now possible to continuously feed an electrode through a guide tube which incorporates various twists and bends. Thus, hard to drill cooling holes on complex airfoils may be produced.

Another advantage of the present invention is that the electrodes can be easily fabricated into curved/helical or other complex shapes. The electrodes are also tolerant of handling in production environments.

Although the invention has been shown and described with respect to detailed embodiments thereof, it should be understood by those skilled in the art that various changes in form and detail may be made without departing from the spirit and scope of the claimed invention.

What is claimed is:

1. A method of electrical discharge machining at least one shaped hole in a metallic article using a shape memory alloy electrode comprising the steps of:

processing at least one shape memory alloy wire electrode to retain a trained shape, said processing step comprising the steps of: i)forming the electrode to a desired end shape by coiling the electrode around a fixture to capture the shape of the fixture, ii)restraining the electrode to the desired end shape by heat treating the electrode, followed by water quenching the electrode;

loading the electrode in an electrical discharge machining device; and electrical discharge machining at least one shaped hole in the article, whereby the hole approximates the trained shape of the electrode.

2. The method of claim 1 wherein at least one shaped cooling hole is produced in a gas turbine engine component.

3. The method of claim 1 wherein the electrode is continuously fed through a stationary, bent guide tube on the electrical discharge machining device.

4. A method of electrical discharge machining at least one shaped hole in a metallic article using a shape memory alloy electrode comprising the steps of:

processing at least one NiTi shape memory alloy wire electrode to retain a trained shape, said processing step comprising the steps of: i)forming the electrode to a desired end shape by coiling the electrode around a fixture to capture the shape of the fixture, ii)restraining the electrode to the desired end shape by heat treating the electrode at about 1000° F. for about 10 minutes, followed by water quenching the electrode;

loading the electrode in an electrical discharge machining device; and electrical discharge machining at least one shaped hole in the article, whereby the hole approximates the trained shape of the electrode.

5. The method of claim 4 further comprising the step of copper plating the NiTi electrode prior to loading the electrode in the electrical discharge machining device.

6. The method of claim 4 wherein said processing step includes forming the electrode to a curved shape.

7. A method of electrical discharge machining at least one groove in a metallic article using a shape memory alloy electrode comprising the steps of:

processing at least one shape memory alloy wire electrode to retain a trained shape, said processing step comprising the steps of: i)forming the electrode to a desired end shape by coiling the electrode around a fixture to capture the shape of the fixture, ii)restraining the electrode to the desired end shape by heat treating the electrode, followed by water quenching the electrode; loading the electrode in an electrical discharge machining device; and electrical discharge machining at least one groove in the article.

* * * * *